A. Q. Allis,
Sewing Machine Treadle.
Nº 79,296.
Patented Jun. 30. 1868.
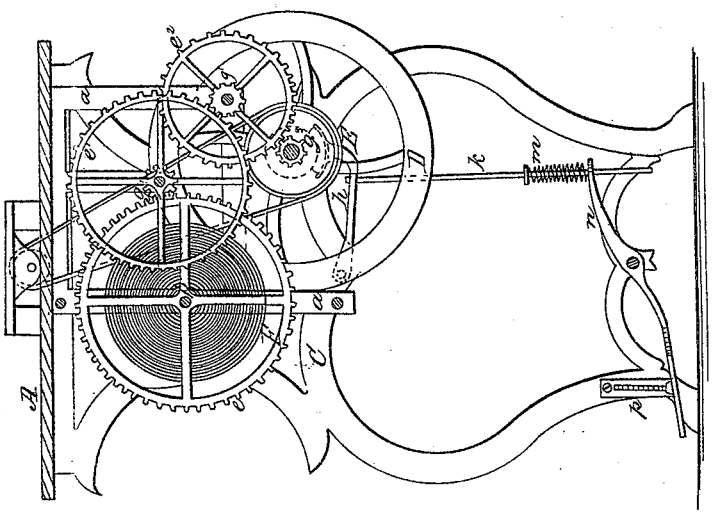
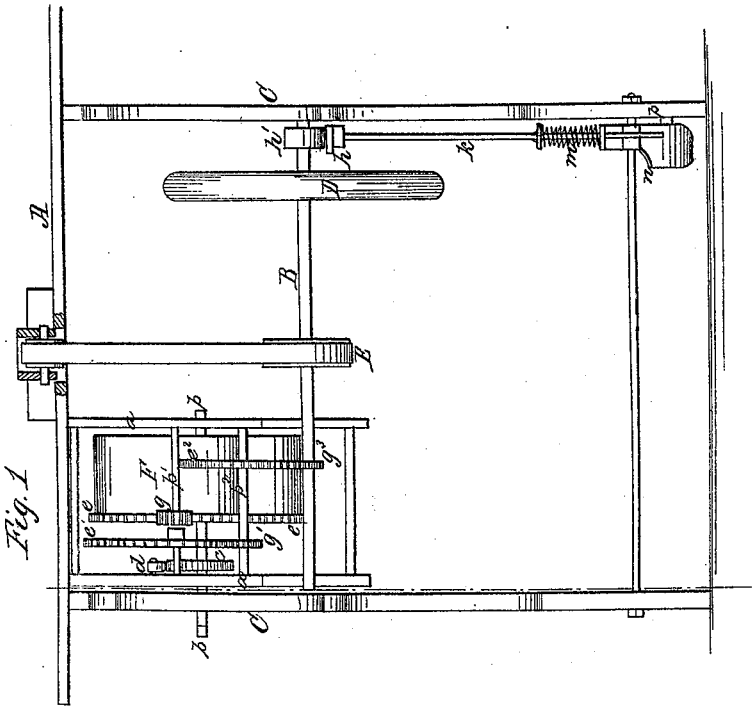
Witnesses:
Theo Tusche
J. A. Service
Inventor:
A. J. Allis
Per Munn & Co
Attorneys

UNITED STATES PATENT OFFICE.

A. Q. ALLIS, OF DAYTON, OHIO.

IMPROVEMENT IN TREADLES FOR SEWING-MACHINES.

Specification forming part of Letters Patent No. 79,296, dated June 30, 1868.

*To all whom it may concern:*

Be it known that I, A. Q. ALLIS, of Dayton, in the county of Montgomery and State of Ohio, have invented a new and useful Improvement in Sewing-Machines; and I do hereby declare that the following is a full, clear, and exact description thereof, which will enable those skilled in the art to make and use the same, reference being had to the accompanying drawings, forming part of this specification, in which—

Figure 1 is a side view of a sewing-machine with my improved spring attachment. Fig. 2 is a vertical cross-section taken in the line $x$ $x$, Fig. 1.

Similar letters of reference indicate corresponding parts.

The nature of this invention consists in an arrangement of a coil spring or springs as the moving power of a sewing-machine for ordinary domestic use, in order to dispense with the treadle for operating the machine with the foot, as usual, together with a device for regulating the motion, as hereinafter described.

A represents the bed of an ordinary sewing-machine operated by a driving-shaft, B, hung in the end framing C C, provided with a fly-wheel, D, and a pulley, E, for running the machine.

Under the bed A is fixed a light rectangular frame, $a$ $a$, in one side of which is placed a powerful flat coil-spring, F, similar in construction to the ordinary clock-spring on the axis $b$ $b$, which has on it a ratchet-wheel, $c$, held by the pawl $d$ when the spring expands to turn the spur-wheel $e$ on the shaft $b$ $b$ to give the required motion to the machine. The spur-wheel $e$ engages a pinion, $g$, on a counter-shaft, $b^1$, that carries another spur-wheel, $e^1$, which engages a pinion, $g^1$, on another counter-shaft, $b^2$, also carrying another spur-wheel, $e^2$, that engages a pinion, $g^3$, on the driving-shaft B.

By this arrangement of a powerful coil spring or springs connected with the driving-shaft of a sewing-machine, it will be seen that the light power required for running it with ordinary work is applied very conveniently instead of using the feet on a treadle to work the machine, as usual, which many ladies find laborious and objectionable.

In order to regulate the motion of the machine, I provide a rubber or brake, $h$, that bears upon a friction-roller, $h'$, on the main shaft B, which rubber $h$ is operated on by a rod, $k$, on the lower end of which is a spiral spring, $m$, the tension of which is governed by a foot-lever, $n$, the outer end of which is set to catch in one of a series of teeth in a rack, $p$, on the frame C, to contract or expand the spring, to exert more or less pressure of the rubber $h$ on the roller $h'$, as required to adjust the motion of the machine to the work.

Having thus described my invention, what I claim as new, and desire to secure by Letters Patent, is—

The arrangement upon the frame A of the spring F on shaft $b$, the ratchet-wheel $c$, pawl $d$, and gear-wheels, $e$, $g$, $e^1$ $g^1$, $e^2$, $g^2$, driving-shaft B, pulley E, fly-wheel D, friction pulley $h'$, brake $h$, rod $k$, spring $m$, treadle $n$, and rack $p$, as herein described, for the purpose specified.

A. Q. ALLIS.

Witnesses:
G. H. WILSON,
DENIS REGAN.